United States Patent [19]

Ito et al.

[11] Patent Number: 4,545,349
[45] Date of Patent: Oct. 8, 1985

[54] METHOD FOR REGULATING INTAKE AIR FLOW FOR INTERNAL COMBUSTION ENGINES

[75] Inventors: Yoshiyasu Ito; Toshio Suematsu; Yuji Takeda; Katsushi Anzai, all of Toyota, Japan

[73] Assignee: Toyota Jidosha Kabushiki Kaisha, Toyota, Japan

[21] Appl. No.: 577,840

[22] Filed: Feb. 7, 1984

[30] Foreign Application Priority Data

Feb. 16, 1983 [JP] Japan .................................. 58-24258

[51] Int. Cl.$^4$ ............................................ F02D 1/04
[52] U.S. Cl. ..................................... 123/339; 123/585
[58] Field of Search ............... 123/339, 480, 585, 586, 123/587, 320, 325, 333

[56] References Cited

U.S. PATENT DOCUMENTS

| | | |
|---|---|---|
| 4,291,656 | 9/1981 | Miyagi et al. ........................ 123/320 |
| 4,344,399 | 8/1982 | Matsumura et al. ................. 123/339 |
| 4,364,349 | 12/1982 | Miyagi et al. ....................... 123/325 |
| 4,430,973 | 2/1984 | Miyagi ................................ 123/585 |
| 4,432,317 | 2/1984 | Kawamura .......................... 123/339 |
| 4,446,832 | 5/1984 | Matsumura et al. ................. 123/339 |

Primary Examiner—Parshotam S. Lall
Attorney, Agent, or Firm—Cushman, Darby & Cushman

[57] ABSTRACT

A method for regulating intake air flow for motor vehicle internal combustion engines in which the duty D of a signal for controlling the opening of an idle speed control valve (ISCV) is maintained at $D=DG-b$, as long as the car is still running in spite of the fact that deceleration operation or low speed running of the car is performed, where DG indicates the learning opening value of the ISCV in a bypass path, and b indicates a predetermined positive value to be corrected, thus strikingly improving so-called "driveability" and fuel consumption rate during the low speed steady running, without changing the ignition timing for the one set for the idling engine.

6 Claims, 6 Drawing Figures

METHOD FOR REGULATING INTAKE AIR FLOW FOR INTERNAL COMBUSTION ENGINES

BACKGROUND OF THE INVENTION

1. Title of the Invention

The present invention relates to an intake air flow regulating method for regulating intake air flow for motor vehicle internal combustion engines, particularly to a method for regulating intake air flow for internal combustion engines for motor vehicles when running under the engine with idle speed controller.

2. Description of the Prior Art

As is known, the idle speed control, which is hereinafter referred to as ISC, for a motor vehicle engine is a method for controlling intake air flow, wherein a set or target speed of rotation, when the engine is in the indling condition is memorized in a memory, engine conditions are detected by each sensor which produces each detected signal and changes an opening of a bypass path, through which air is sent to a combustion chamber bypassing a throttle valve so as to equalize the speed of engine rotaions to the set speed of rotations.

Heretofore, as mentioned above, when an internal combustion engine wherein ISC is performed is not in the idling condition, for example when the engine is in a running condition, an idle speed control valve (ISCV) for regulating the opening of the bypass path is maintained constant in the opening. This opening condition is determind by a learning value of the opening of ISCV, which is finally set when a feedback control for ISC is being performed. The learning value is an actual opening value which continues to be memorized as long as a feedback control for ISC is being performed.

An idle switch connected to the throttle valve and detecting a fully closed condition of the thrrottle valve itself is difficult to turn ON at the time the throttle valve is completely or fully closed due to the nature of its construction. For this reason, the idle switch has been already turned ON in the condition where the throttle valve is in an opened condition in some degree. In this case, when a driver is trying to make a steady running at relatively low speed, the normal or steady running can be performed without almost operating an accelerator, i.e. without opening the throttle valve so much since ISCV mention above is in the open condition with the learning opening value.

In the steady running, if the throttle valve opening is too small, the idle switch may become turned ON due to the nature of the idle switch even when the opening of the throttle valve is not zero. When the idle switch is turn ON, a control unit which controls the ignition timing of the internal combustion engine decides that the engine is whether in the condition of idling or in the condition of deceleration, with the idle switch being turned ON and it changes the ignition timing to that set in the condition of no load, that is, the ignition timing for an idling engine. The angle of this ignition timing in this case, is more delayed during running and therefore it can no longer coincides with the ignition timing necessary for the steady running, with the result that the driveability as well as fuel consumption rate are deteriorated.

Figure 1:
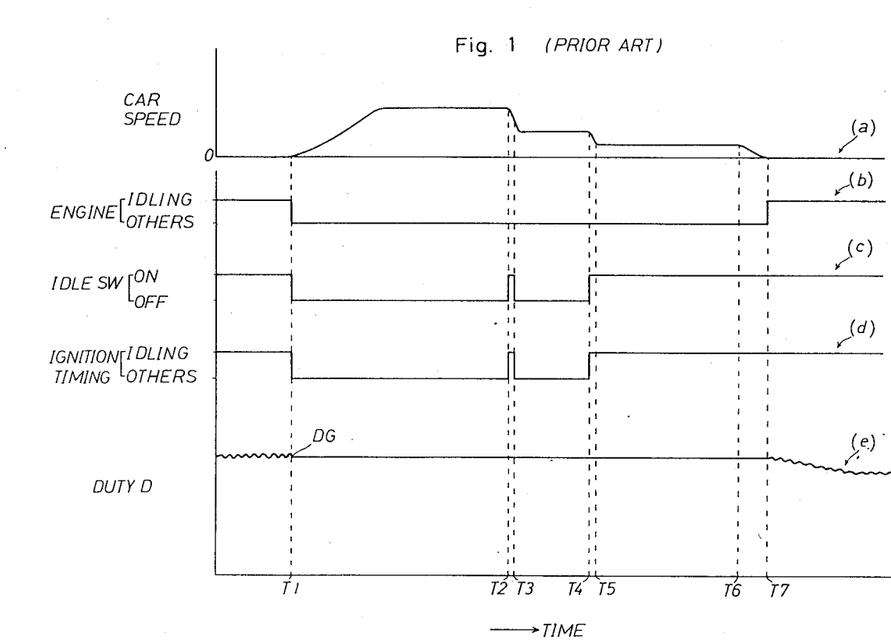
FIG. 1 illustrates a timing chart which shows car speed, engine condition, idle switch condition, the igntion timing, and the duty according to the prior art.

FIG. 1 shows a timing chart for controlling the operation of the ignition timing. The waveform (a) indicates the change in car speed as time is elapsed, (b) indicates the change in the time between the idling condition of the internal combustion engine and a time the engine is in a condition other than the former condition, (c) indicates the change in the time between the turning ON and OFF of the idle switch, (d) indicates the change in the time between the ignition timing for the engine idling engine and the ignition timing other than the former period, (e) indicates the change in the duty D of a signal for controlling the opening of ISCV as the time elapsed.

First of all, the waveform (b) shows that before the time T1, the engine is in the idling condition, the car speed is zero, and the idle switch is ON while the ignition timing is set for the idling engine, and the duty D is calculated according to a feedback control, and the opening of ISCV is automatically controlled in accordance with the result of the calculation.

At the timing T1, the accelerator is operated and a clutch is engaged so as to change the engine from the engine idling condition. In this case, when the car is started, the idle switch is turned OFF. As a result, the ignition timing is changed from that set when the engine is idling to that for controlling the running with a load, and the duty D is set to the learning value DG including the final duty of the feedback control, while the opening area of ISCV is fixed to the area corresponding to the learning value.

Then, in the acceleration and in the steady running thereafter, no more change occurs to the idle switch, the ignition timing and the duty D. At the timing T2, the accelerator is released and the operation for lowering the car speed is carried out by operating the break pedal or the engine break. In this case, the idle switch is turned ON until the timing T3 when the accelerator is operated again. As a result, the ignition timing is changed to the ignition timing set for the idling engine. However, after the timing T3, as the accelerator is pressed to some degree for changing to the steady running of relatively high speed, then the timing condition of idle switch, engine, ignition timing become the same as before the timing T2.

When the car speed is lowered again at the timing T4, the idle switch is turned ON, similar to the condition at the timing T2 and the ignition timing in the engine of idling is performed. However, although the accelerator pedal is operated in order to make the relatively low speed steady running from the timing T5, the steady running in this case is the one with a small load. Accordingly, almost to pressing of the accelerator pedal is required and the idle switch remains turned ON.

As a result, it follows that ignition timing of the engine in an idling condition continues to another time period although the ignition timing is for the steady running. Namely, the steady running from the time period between T5 and T6 during which the brake is operated, is the running due to the ignition timing for the idling engine, which results in the degradation of the drivability and the fuel consumption rate. In this case, FIG. 1 shows that during the time period between T6 and T7, that deceleration is performed and after the timing T7, the engine becomes in a condition of idling.

SUMMARY OF THE INVENTION

It is therefore a main object of the present invention to provide a method of regulating intake air flow for the internal combustion engine of motor vehicles wherein in the internal combustion engine ISC is performed to prevent the ignition timing period from being changed to that for the idling engine during low and steady running of the car when the idle switch turns ON, and after the result of study, there being obtainable a control excelling in durability and fuel saving without changing the ignition timing to that set when the engine is idling.

It is another object of the present invention to provide a method for regulating intake air flow for a motor vehicle internal combustion engine in which first and second determinations are made whether or not engine is in the idling condition and the idle switch is in the ON condition respectively and the opening of a first bypass path is retained either to the learning opening value reached just before the termination of a feedback control or to a value which is smaller than the learning opening value in accordance with the result of the second determination.

It is further object of the present invention to provide a method for regulating intake air flow for motor vehicle internal combustion engine in which a predetermined value is set into a counter, which is corresponding to a certain time period and the counter is checked whether or not the content of the counter is equal to or smaller than 0 so as to determine the duty to be the opening value smaller than the learning duty.

It is still another object of the present invention to provide a method for regulating intake air flow for motor vehicle internal combustion engine in which the duty is maintained at the value smaller than the learning opening value, as long as the car is still running notwithstanding the fact that the deceleration operation or low speed running of the car is performed.

These and other objects of the present invention and advantages thereof will be apparent from the following description in conjunction with the accompanying drawings.

DETAILED DESCRIPTION OF THE PREFERRED EMBODIMENT

Figure 2:
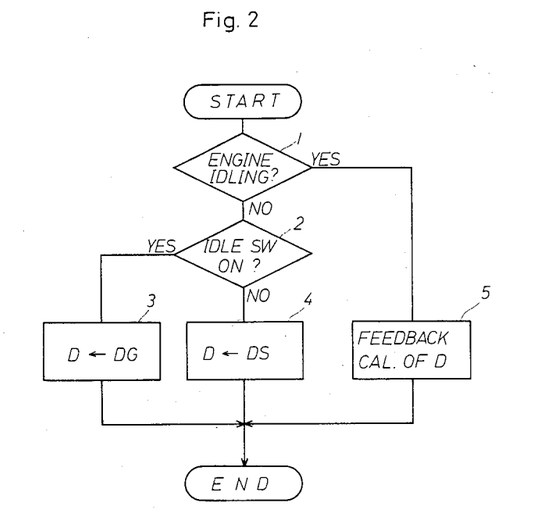
FIG. 2 illustrates a basic flow chart of the operations for the method according to the present invention.

FIG. 2 shows a basic flow chart of the operation according to the present invention. In the figure, reference numeral 1 indicates the step for determining whether or not the engine is in the idling condition. In this step 1, if the engine is in the idling condition, it is determined YES, the operation moves to the next step 5. In this step 5, a feedback calculation is performed for controlling the duty D of ISCV, and in accordance with the result of the calculation, the duty D is controlled so as to equalize the number of engine rotations to the target number of engine rotations. In the decision-making step 1, if the result of the decision is NO, the operation moves to the step 2, where the determination or decision is made as to whether or not the idle switch is in the ON condition. In this case, if the idle switch is ON, the result of the decision becomes YES and now the operation goes to the step 3. In this step 3, the duty D of the ISCV is set to value which is equal to the learning duty DG. The value of the duty DG coinincides with that of the duty D that is set just before idling is terminated and the idling switch is turned OFF.

Learning duty DG is the target value for controlling that is used in adaptive control learning. Said adaptive control learning is a control for ISCV to detect the change, friction, and retrogression which change of environment condition causes. On the other hand, if the idle switch is OFF, the result of the decision becomes NO and the operation moves to the step 4. In this step 4, the duty D of the ISCV is set to a duty DS which is lower than the learning duty DG. In this manner as mentioned above, the basic control for the engine according to the present invention is carried out.

Figure 3:
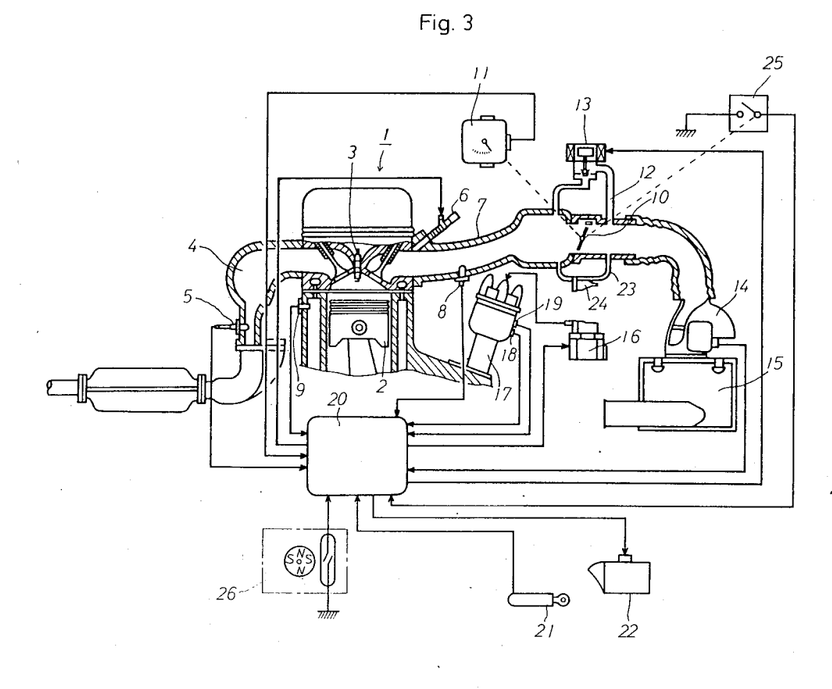
FIG. 3 illustrates an overall construction of the engine system including an engine and peripheryal elements and units to which the present invention is applied.

FIG. 3 shows one embodiment of an engine system including an internal combustion engine and its peripheral units to which the method according to the present invention is applied. In FIG. 3, the engine system comprises the engine 1, a piston 2, a spark plug 3, an exhaust air manifold 4, an oxygen sensor 5 mounted in the exhaust air manifold for detecting the remaining oxygen density in the exhaust gas, a fuel injection valve 6 for injecting fuel to the inside air taken into the engine 1, an intake manifold 7, an intake air temperature sensor 8 provided in the intake manifold for detecting the temperature of the intake air to be sent to the engine, a water temperature sensor 9 for detecting the temperature of the cooling water for the engine, a throttle valve 10, a throttle valve position sensor 11 for producing a signal in accordance with the opening of the throttle to which air is sent and bypassing the throttle valve an idle speed control valve 13 (ISCV) provided at the bypass path for controlling the opening (area) of the bypass path in accordance with a control signal for instance, a signal of duty which represents how large the opening and the signal is produced from an electronic control unit described later, an air flow meter 14 for measuring the intake air flow, and an air cleaner 15 for purifying the intake air.

The engine system in FIG. 3 also comprises an igniter 16 for generating a high voltage necessary for the ignition of the ignition plugs, a distributor 17 which is connected to a crank shaft not shown and distributing the high voltage produced by the igniter to the ignition plugs of each air cylinder, a rotation angle sensor 18 provided in the distributor for producing pulse signals, and outputting 24 pulse signals at every one revolution of the distributor, in other words, at every two revolutions of the crankshaft, an air cylinder identifying sensor 19 for producing one pulse signal for every one revolution of the distributor, an electronic control unit 20, a key switch 21, and a starter motor 22.

In addition, the engine system according to the present invention also comprises first bypass path 23 bypassing the throttle valve, and air is sent to said bypass path at the first time the engine is in the condition of idling when the engine is cooling, an air valve 24 for controlling air flow passing through the second bypass path for the fast idling. The air valve 24 operates in such a manner that it opens the bypass 23 so as to secure a predetermined speed of rotations of the engine necessary for the warming-up operation thereof when cooling the engine.

The engine system further comprises an idle switch 25 which is connected to the throttle valve for detecting the fully closed condition of the throttle valve and for producing an ON signal, and a car speed sensor 26 which is also connected to a shaft of the car and for producing pulse signals in response to the car speed.

Figure 4:
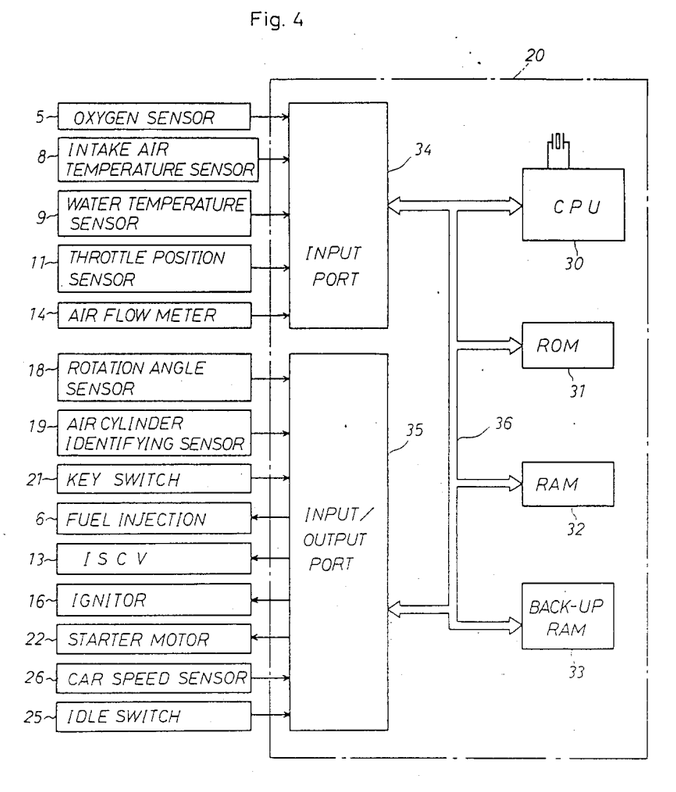
FIG. 4 illustrates an electronic control unit of FIG. 3 with its detailed construction, according to the present invention.

FIG. 4 shows a detailed construction of the electronic control unit 20 shown in FIG. 3. The control unit 20 comprises a central processing unit (CPU) 30, a read only memory (ROM) 31, a random access memory (RAM) 32, a back-up RAM 33, an input part 34 having an input port not shown, if necessary, a wave shape circuit, a multiplexer for selectively producing output signals from each sensor to the CPU 30 and an analog/digital converter (an A/D converter) for converting analog signals into digital signals. The input/output part 35 includes an output port as well as, input port (not shown), and said input/output port 35 further includes a driving circuit which is able to be driven by ISCV 13 in accordance with a control signal fom at CPU 30 in case of need.

The input of the input part 34 having the constructing elements mentioned above is connected to each output of the oxygen sensor 5, the intake air temperature sensor 8, the water temperature sensor 9, the throttle valve position sensor 11, and the air flow meter 14, respectively. The output of the input part 34 is communicated with the CPU 30, the ROM 31, the RAM 32 and the back-up RAM 33 through a bus 36.

The input of the input port of the input/output part 35 is connected to the output of the rotation angle sensor 18, the air cylinder identifying sensor 19, the key switch 21, the idle switch 25 and the car speed sensor, respectively, and the output of the input port of the part 35 is also communicated with the CPU 30, the ROM 31, the RAM 32, and the back-up RAM 33 through the bus 36. The output of the output port of the part 35 is also communicated with the fuel injection valve 6, the idle speed control valve 13, igniter 16 and the starter motor 22 through the driving circuit (not shown).

The CPU 30 reads and calculates data corresponding to the output signals produced from each sensor and sent to the input part 34 in accordance with a control program, and also controls each operating unit including ISCV 13. The ROM 31 stores the control program and initial data while the RAM 32 stores various data to be inputted to the control unit 20 and necessary for calculating and controlling various units and elements. The back-up RAM 33 which is supported or backed up by a battery, stores and retains data necessary for operating the engine even after the key switch 21 is turned OFF.

The control unit 20 operates, if, for instance, the idle switch 25 is in the ON condition while the car speed detected by the car speed sensor 26 is zero, and decides that the engine is in the idling condition and tries to carry out the feedback control of ISCV 13. However in the condition that engine is hot idling, the control unit 20 retains the ISCV 13 to a predetermined opening when the engine is hot in a condition of idlling. Moreover, when the idle switch 25 has been turned ON, the control unit 20 decides that the engine is in the idling condition or in the deceleration condition with no load ignition timing is changed to that performed when the engine is in the condition of idling.

Figure 5:
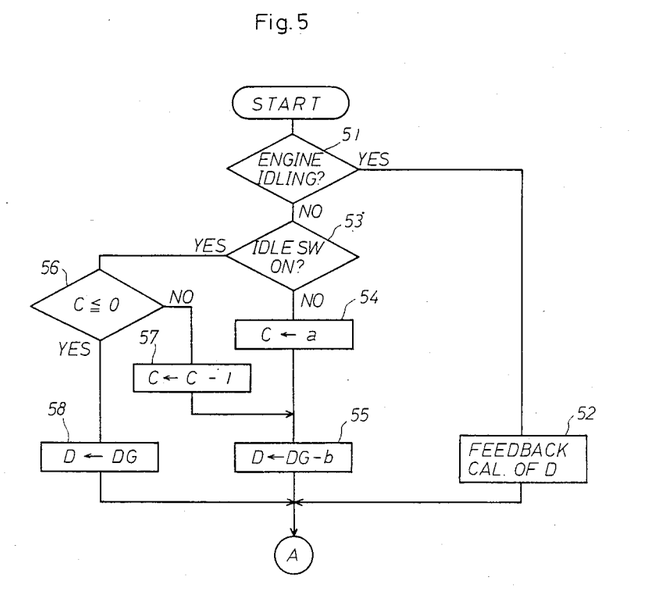
FIG. 5 illustrates a detailed flow chart of the operations of FIG. 2 of the embodiment according to the present invention.

FIG. 5 shows an time interrupt routine of one embodiment utilizing the microprocessor, according to the present invention. In FIG. 5, the step 51 shows an operation for determining whether or not the engine is in the idling condition. The determination is made in such a manner that if the idle switch 25 is ON and the car speed detected by the car speed sensor 26 is zero, the result of the decision or determination is YES showing that it is the idling condition. However, if the idle switch is OFF or the car speed detected by the car speed sensor is not zero, a decision of NO is made, showing it is not an idling condition.

As described above, if the result of the decision in the step 51 is YES, the operation moves to the step 52 where the duty D is calculated by the feedback control so as to equalize the speed of engine rotations to the target speed of rotations, and the duty D is the ratio of the ON period to the OFF period of the signal applied to the ISCV 13. In this subroutine, the normal idling feedback control is performed in the engine idling condition.

In the step 51, if the result of the decision is NO, the operation now moves to the next step 53, where the decision is made as to whether or not the idle switch 25 is turned ON. In this case, if the idle switch 25 is not turned ON and the result of the decision is NO, then the operation moves to the step 54. In the step 54, a predetermined value a corresponding to a predetermined time is set to a counter C and the operation moves to the step 55. In the step 55, the duty which was subtracted from a learning value DG by a positive value b to be corrected as the duty D in an open loop, which is the condition without the feedback control, is set and the subroutine is terminated at the point marked as A.

Here, it is desirable for the predetermined value a to be selected between 2 to 3 seconds while it is desirable for the positive value b to be selected between 15 to 30% to the learning duty DG in order to improve a subroutine effect.

In the step 53, if no engine idling condition exists and the idle switch 25 is turned ON, the result of the decision is YES, and then the operation moves to the step 56 where a decision is made as to whether or not the content of the counter C is equal to or less than zero. If the content of the counter C is positive, the result of the decision is NO and the next step 57 is to be executed. Namely, in the step 57, the content of the counter C is decremented by 1, and in the step 55, the value which was subtracted from the learning duty DG by the positive value b to be corrected as the duty D in the open loop, and the operation is way out of the subroutine at the point A.

On the other hand, if the content of the counter C becomes 0 or less than 0 by the repeated decrement operation, the result of the decision in the step 56 becomes YES and the operation moves to the next step 58.

In the step 58, the learning duty DG is set, as it is, as the duty D in the open loop and the operation is way out of the subroutine and is terminated at the point A.

Figure 6:
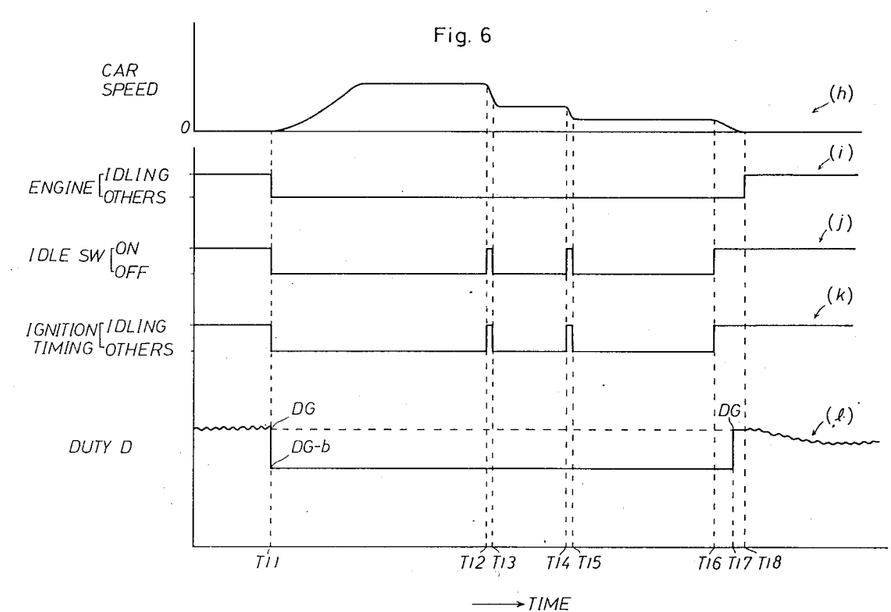
FIG. 6 illustrates a timing chart which shows the car speed, the engine condition, the idle switch condition, the ignition time, and the duty for the operation according to the present invention.

The foregoing operation flow will be described in connection with the actual car running, with reference to the timing chart shown in FIG. 6. In FIG. 6, the characteristic curve (h) indicates the change in the car speed as the time elapsed, (i) indicates the change in the time between the time at which the engine is in an idling condition and the time at which the engine is not idling, (j) indicates the change in the time from the time the idle swich is turned ON and turned OFF, (k) indicates the timing chart of ignition timing, and (l) indicates the change of duty D of a signal for controlling the opening area of the ISCV 13.

In operation, first of all, the turning ON of the key switch 21 for ignition causes the processing or operation of the subroutine to be started and the engine begins rotating. If the engine is in the idling condition, the result of the dicision in the step 51 becomes YES and the operation moves to the next step 52, where the duty D is sought by the feed-back calculation and the ISCV is controlled in accordance with the value of the duty D. This operation corresponds to the condition before the timing T11.

Next, when the car begins running, since the engine is not in the condition of idling, the result of the decision in the step 51 becomes NO and the operation moves to the next step 53. In this step 53, when determining the ON or OFF condition of the idle switch, the car is accelerated so the accelerator is sufficiently pressed and the result of the decision beomes NO as the idle switch is of course in the OFF condition. Next, in the step 54, the predetermined value a is set into the counter C and the operation moves to the step 55. In this step 55, the value which was subtracted from the leaning duty DG by the value b and is memorized in a memory set for D, and the value is memorized in the memory just before the processing of feedback terminates. After that the opening of the ISCV 13 is maintained constant in accordance with the duty D in a driving step not shown here. In detail, when the idle switch is in the OFF condition, it follows that the car runs with the ISCV 13 slightly closed as compared with the conventional technique. As a result, for the purpose of carrying out the same running as the conventional one, if follows that the opening of the throttle valve 10 must be opened much more by the amount corresponding to the amount of opening of closed ISCV. In other words, the result is then, the opening of the throttle valve 10 is closed to a certain extent in contrast with that of throttle valve with the idle switch 25 turned ON.

Afterwards, as long as the car is running in the accelerating condition or in the steady running, the idle switch 25 will be never turned ON and the ISCV 13 continues holding the opening slightly smaller than the learning duty DG. In the timing T11 and T12 to FIG. 6 shows this condition.

The case of operation for deceleration is referred to hereinafter.

In the condition that the idle switch 25 is not turned ON, even if the operation is performed for releasing the accelerator, the opening of the ISCV 13 continues to take the small opening by the amount b which is smaller than the learning duty DG. However, if the accelerator is completely detached and the idle switch becomes turned ON, the result of the decision in the step 53 becomes YES and the next step 56 is to be executed. In the step 56, the counter C is checked. In this case, the counter C measures the time after the idle switch 25 was changed from the turning OFF to the turning ON. That is, unless the time corresponding to the predetermined value a elapses after the idle switch 25 was turned ON, the operation is repeated again in such a manner that the step 55 is executed through the step 57 and the ISCV 13 is still maintained smaller than the learning duty by the amount b. The time period between T12 and T13 and the time period between T14 and T15 this condition is shown.

Next, when the deceleration operation is terminated within the time period which corresponds to the predetermined value a, the idle switch 25 is turned OFF, so that the result of the decision in the step 53 becomes NO, and the next step 54 is to be executed.

In the step 54, the counter C is set for the value a and then the operation moves to the next step 55, where the ISCV 13 is maintained smaller in opening than the learning duty DG by the value b, and steady running in the lower speed of the car is performed. As described above, it is desirable for the predetermined value a to be set for the value correspoinding to the time between 2 and 3 seconds. In the normal deceleration operation when the car is not stopped, the ON condition of the idle switch 25 is terminated within the time corresponding to the predetermined value a and it returned to the OFF condition. Therefore, in the deceleration operation whenever the car speed is not zero, the step 58 will be never executed normally and the ISCV 13 will be never opened to the amount of opening which, equal to the value of learning duty DG. Moreover, in order to carry out the steady running the throttle value 10 must be opened in some degree, and it will never occur the steady running is performed with the idle switch being in the ON condition. As a result, the ignition timing is never changed to that of the engine in the condition of idling. FIG. 6 shows this condition in the time period between T14 and T15, and between T15 and T16.

The conventional technique described in the foregoing with reference to FIG. 1 in which relatively low speed steady running is performed with the idle switch 25 being in the ON condition, and said relatively low and steady running is performed in the time period between T5 and T6 which corresponds to the time period between T15 and T16 in FIG. 6. However, in the embodiment according to the present invention, even if such low and steady running as described above is performed, the idle switch 25 will never become turned ON. Accordingly, the ignition timing never changed to that set when the engine is idling.

Next, when the car is going to be gradually stopped as the result of by the deceleration operation, the ISCV 13 represents the opening smaller than the learning duty DG by the value b within the time corresponding to the predetermined value a, but afterward of it the opening of the ISCV 13 represents the value equals to that of the DG as the result of the execution of the step 58. Then, the car is stopped without changing the duty of DG, the engine immediately enters into the idling condition, and the feedback control is performed. In the time period between T16 and T18 in FIG. 6 this condition is shown. It will be appreciated from FIG. 6 that D is set for duty DG of the timing T17 when the period of time which corresponds to value a is elapsed from the timing T16.

In the above operation, if the duty D is set for the learning duty DG in the step 58 and the opening of the ISCV 13 remains in the opening smaller than the DG by the value b just before the engine becomes the idling condition, the intake air flow shortage condition will continue for a long period in very low speed and said condition of idling engine result in a so-called "engine stop" phenomenon. Accordingly, it is necesary to set D for the duty DG when the idle switch 25 is turned ON and the engine is not in the idling condition.

In the foregoing embodiment according to the present invention, during the running of the car, since the opening of the ISCV 13 is set for the value smaller than the learning duty DG, so the car speed will begin to lower, if the throttle valve 10 has been closed even just before the idle switch 25 becomes ON. Therefore, in order to carry out the steady running, it is necessary for the opening of the throttle valve 10 to be always opened much more in some degree than in the ON condition of the throttle valve. As a result, the steady running will never occur with the idle switch in the ON condition. Therefore, the ignition timing is by no means set for that which is set when the engine is idling in the condition of steady running. Thus, degradation of drivability and fuel consumption rate are prevented.

In the foregoing embodiment according to the present invention, when the idle switch has been changed from the OFF condition to the ON condition, the value of the duty D becomes again the learning duty DG by the counter C after a predetermined time has elapsed. Moreover, duty D may well be made set at the duty Do before the predetermined time has elapsed, so that instantly the idle switch changes from OFF to ON. In this case, in the characteristic curves in FIG. 6, the duty D is set for the duty DG between the time period T12 and T13 and time period T14 and T15 as well as the time period between T16 and T17. The operation flow chart will become similar to the one shown in FIG. 1. It is preferable to take a predetermined time because taking a predetermined time interval helps to prevent the ignition timing from being changed to that which is set when the engine is in an idling condition at the time of low and steady running.

According to the present invention as described in the foregoing, it is possible to realize the effective control for engines for remarkably improving the drivability and the fuel consumption rate without changing the ignition timing time is not for the one for the engine is idling during the steady running of the car, by the unique method characterized in that the method for regulating intake air flow for motor vehicle internal combustion engines having the steps of changing the opening of a first bypass path which bypasses a throttle valve and which also bypasses air to be sent to a combustion chamber in accordance with the difference between a set or target value for the engine rotations and the actual speed of engine rotations so as to equalize the actual speed of engine rotations to the set value by feed-back control and to change the ignition timing set when the engine is idling when the engine is in the idling condition, keeping the opening of said first bypass path to the learning opening condition just before the feedback control has been terminated and changing the ignition timing to the one for the engine is idling when an idle switch which detects the fully closed condition of the throttle valve, in ON when the engine is operating other than the engine idling condition, wherein the method further comprises the step of holding the opening of the bypass path smaller than the learning opening condition reached just before the termination of the feedback control when the engine is in the operating conditions other than the engine idling and the idle switch is in the OFF condition.

While the invention has been described in its preferred embodiments, it is to be understood that the words which have been used are words of description rather than limitation and that various changes and modifications may be made within the purview of the appended claims without departing from the true scope and spirit of the invention in its broader aspects.

What is claimed is:

1. A method for regulating intake air flow for internal combustion engine which comprises:
   providing an idle switch connected to a throttle valve for detecting the closed condition of the throttle valve and outputting an ON signal;
   providing an idling detector means to determine an idling condition of the internal combustion engine after said idling switch outputs an ON signal and detection of the speed of the car as zero;
   providing an intake air flow control means for controlling the amount of air flow sent to a combustion chamber by bypassing the throttle valve; said method comprising the additional steps of
   (a) outputting a feed back control signal to the intake air flow control means for adjusting the number of engine rotations to the predetermined target number of engine rotations;
   (b) outputting a first holding control signal to the intake air flow control means for holding the intake air flow amount sent by bypassing the throttle valve less than a memorized learning intake air flow amount by a predetermined air flow amount just before the feed back control terminates, when the engine is not in the condition of idling and the idle switch outputs an OFF signal; and
   (c) outputting an ignition control signal for setting the ignition timing for an idling engine, when the internal combustion engine is in the condition of idling, or when the internal combustion engine is not in the condition of idling and the idle switch outputs an ON signal.

2. A method for regulating the intake air flow for an internal combustion engine as in claim 1, wherein the predetermined intake air flow amount of the internal combustion engine equals 15–30% of the learning intake air flow amount.

3. A method for regulating the intake air flow for an internal combustion engine as in claim 1 wherein the feed back control signal and the holding control signal are represented by a duty that is the ratio of the ON period and the OFF period of the digital signal.

4. A method for regulating intake air flow for internal combustion engine as in claim 1, wherein
   said step (c) includes the following step or
   (d) outputting the first holding control signal continuously for a predetermined time period, in spite of an ON condition of the idle switch when the engine is not in the condition of idling.

5. A method for regulating intake air flow for internal combustion engine as in claim 4, wherein
   said step (d) includes the steps of
   (e) measuring the elapsed time period since the idle switch became ON and outputting the first holding control signal without a break from the time the predetermined time period is elapsed, in case the elapsed time period since the idle switch being ON is shorter than the predetermined time period, and
   (f) keeping on intake air flow as an amount of said memorized learning intake air flow amount since the predetermined time is elapsed, in case the elapsed time period since the idle switch being ON is no longer than the predetermined time period.

6. A method for regulating intake air flow for an internal combustion engine as in claim 5 wherein the predetermined time period is within the range of 2–3 sec.

* * * * *